April 12, 1960 W. L. RIPLEY 2,932,418
UTILITY TRAILER
Filed March 26, 1957 2 Sheets-Sheet 1
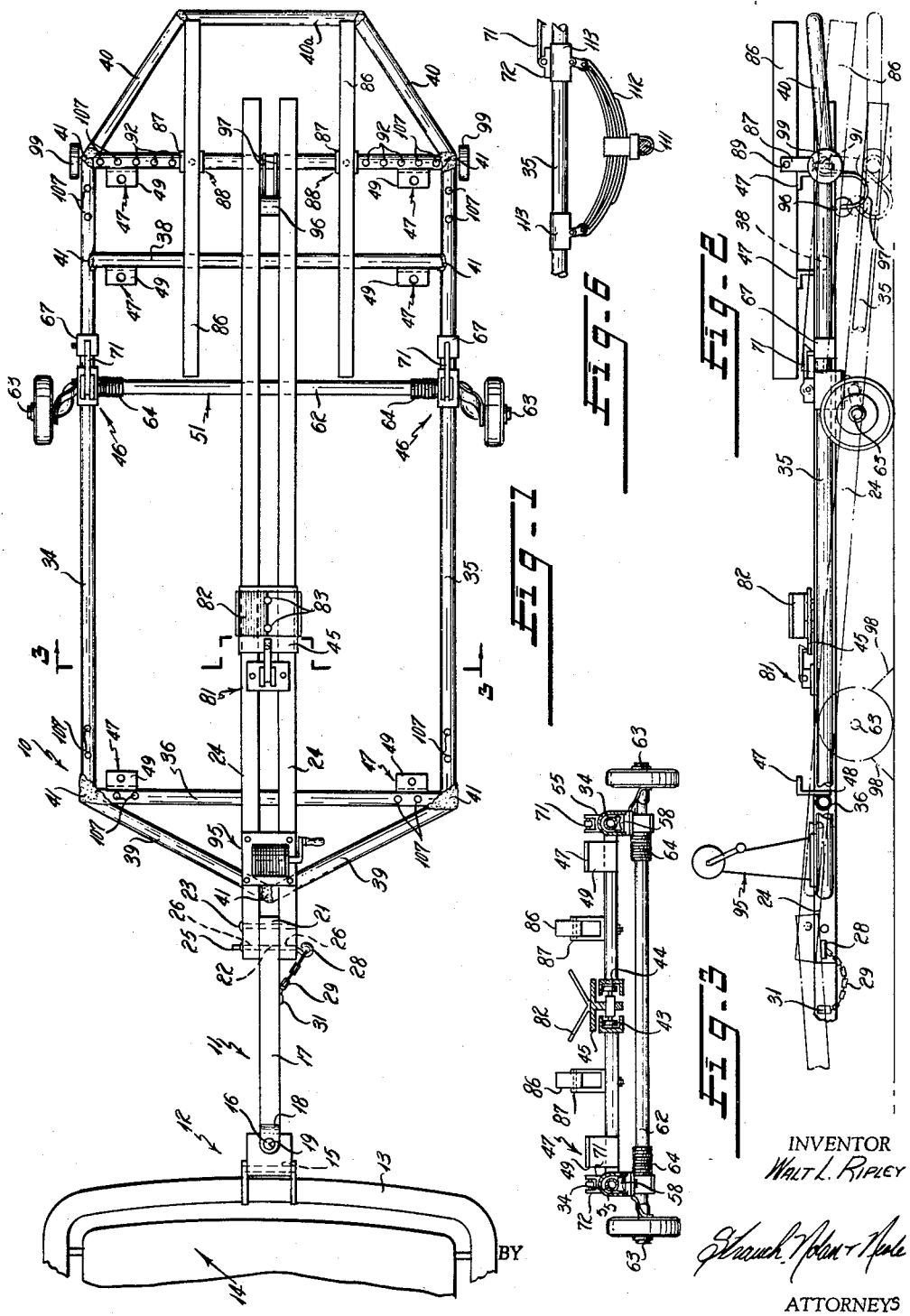
INVENTOR
WALT L. RIPLEY
ATTORNEYS April 12, 1960 W. L. RIPLEY 2,932,418
UTILITY TRAILER
Filed March 26, 1957 2 Sheets-Sheet 2
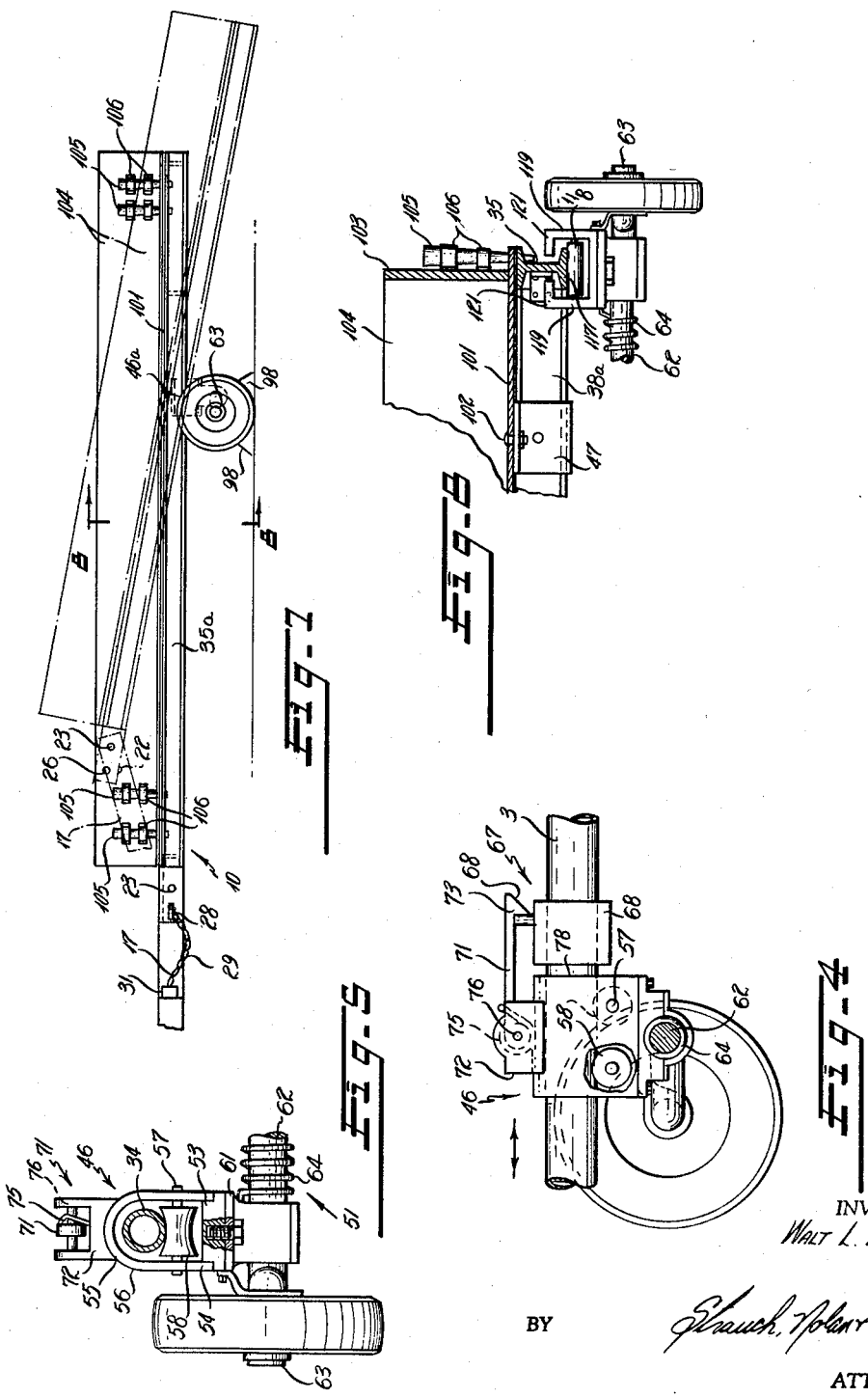
INVENTOR
WALT L. RIPLEY
BY
ATTORNEYS

# United States Patent Office 2,932,418
Patented Apr. 12, 1960

2,932,418

UTILITY TRAILER

Walt L. Ripley, Yankeetown, Fla., assignor to Paul C. Lyons, Crystal River, Fla.

Application March 26, 1957, Serial No. 648,645

2 Claims. (Cl. 214—505)

The present invention relates to improvements in trailer constructions and more particularly to an improved utility trailer adapted for use by a private boat owner, home owner or farm or estate owner using his conventional passenger automobile as the tractor unit.

While utility trailers for such usage have been previously proposed, such prior utility trailers have not been constructed to permit ready selective conversion for use as boat trailers at one time and general load carrying trailers at other times. Such prior utility trailers also do not, so far as can be determined, provide any means for tilting the trailer under control of the tractor unit to effect satisfactory unloading and loading of a boat or other load carried by the utility trailer although body tilting means have been heretofore proposed as will be clear from an inspection of United States Letters Patent 2,485,- 793 to I. D. Vassar, 2,707,061 to K. D. Legg and 2,765,- 942 to E. J. Niemeier and French Letters Patent 726,877 to Tifine and Moriet and 847,437 to Crescent and Perrin.

It, accordingly, is a primary object of this invention to provide a utility trailer for use with a conventional passenger automobile in the form of a skeleton frame adapted selectively to support and transport a boat and to support a load body for transporting bulk loads or light machinery such as power lawn mowers or the like.

It is a further important object of this invention to provide a utility trailer having a skeleton frame with a directly mounted, relatively slidable wheel and axle assembly and a hinged hitch tongue or bar adapting the skeleton frame for relative bodily and tilting movement with respect to the wheel and axle assembly, the relative sliding movement and tilting being effected by relative backward movement of the tractor unit and skeleton frame relative to the wheel and axle assembly and under control of the backward movement of the tractor unit.

Another object of the present invention is to adapt the utility trailer of the preceding object for different degrees of tilting within a limited range of tilting dependent solely upon the extent of relative backward movement of the tractor unit and skeleton frame with respect to the wheel and axle assembly.

A still further object of the present invention resides in the provision of loading and unloading utility trailer that is extremely simple in construction and operation and inexpensive to construct.

Still another object of the present invention is to provide a utility trailer for transporting pleasure boats in the form of a skeleton frame having a novel removable cradle for supportingly engaging the boat hull toward the stern and a relatively movable carriage for supportingly engaging the boat hull adjacent to the bow.

A further object of te present invention is to provide the utility trailer of the preceding object with a simple, effective, inexpensive carriage locking means adapted to lock the carriage in its normal boat transporting position.

Still another object of the present invention is to provide a utility trailer with a hinged tractor hitch adapting the trailer frame or frame and body for relative tilting movement with respect to the trailer wheel and axle assembly under controlled relative backing movement of the tractor.

Further objects will appear from the following description and appended claims when read in conjunction with the attached drawings:

Figure 1 is a top plan view of a preferred form of the skeleton frame trailer of the present invention with the removable floor and side omitted, the boat supporting cradle and movable carriage structure in operating position;

Figure 2 is a side elevational view of the skeleton frame trailer of Figure 1 showing in dot-dash lines the tilted loading and unloading position of the frame relative to the wheel and axle assembly;

Figure 3 is a transverse sectional view taken substantially on the line 3—3 of Figure 1 looking in the direction of the arrows;

Figure 4 is an enlarged side elevational view of a fragment of the trailer of Figure 1 taken substantially on the line 4—4 of Figure 1 looking in the direction of the arrows with certain parts broken away for clarity of illustration;

Figure 5 is an enlarged end view of the slidable wheel support brackets employed in the trailer of Figure 1;

Figure 6 is a fragmental detail view illustrating an alternative directly mounted slide wheel bracket for use in the trailer of Figure 1 provided with a conventional leaf spring type of wheel and axle assembly;

Figure 7 is a side elevational view of a further embodiment of a trailer of the present invention utilizing I-beam framing members and illustrating the removable floor and sides mounted on the framing, the dot-dash line illustration showing the frame and trailer body in an alternate tilted position from that of Figure 1; and Figure 8 is a fragmental sectional view taken substantially on line 8—8 of Figure 7 illustrating the alternate form of slide bracket used in this form of the invention.

With continued reference to the drawings wherein the same reference numerals are used throughout to designate the same parts, the numeral 10 designates generally a trailer built in accordance with the present invention.

Referring for the moment to the embodiment of the invention disclosed in Figures 1–5, the trailer 10 is adapted, through a novel hinged hitch 11, for connection to a conventional hitch bracket 12 carried by the bumper 13 of a conventional passenger automobile 14. As clearly illustrated in Figure 1, the hitch bracket 12 embodies right angularly related pivot pins 15 and 16 forming in effect a universal joint connection permitting relative up and down movement and relative sidewise movement of the trailer hitch 11 with respect to the bumper of the automotive passenger vehicle utilized as a tractor unit. It is to be understood that the particular form of trailer hitch bracket 12 disclosed is not essential so long as a satisfactory universal connection to the hitch bracket is provided. The specific structure shown is, therefore, intended merely for illustration purposes.

As will be clear from an inspection of Figures 1 and 2 of the drawings, hitch 11 comprises a draw bar 17 the forward end of which is provided with clevis arms 18 having aligned openings 19 adapting the draw bar for pivoted connection to the hitch bracket pivot pin 16. The opposite end of draw bar 17 is provided with transversely extending apertures 21 and 22 adapted respectively to receive a permanent hinge pin 23 carried by the forward centrally disposed channel bars 24 which extend longitudinally of the trailer 10 beyond the front and rear laterally extending frame elements and a removable locking pin 25 passing through aligned apertures 26 formed in the forward ends of channel bars 24. Pin 25 preferably is provided with an enlarged head 28, preferably of ring shaped contour providing a ready means for receiving a screwdriver of the like for withdrawing the locking pin and also preferably providing an attachment loop for one end of a retainer chain 29 the other end of which is secured to the draw bar 17 in any suitable manner as indicated at 31.

The trailer 10, in addition to centrally located channel bars 24, comprises a skeleton frame made up of tubular side members 34 and 35, right angularly related tubular front end rear frame elements 36 and 37, a tubular rear, cross-brace, element 38 and forwardly and inwardly sloping front brace elements 39 also of tubular configuration. These various tubular elements are preferably rigidly joined to one another by welding indicated generally by the numeral 41 in the drawings. While this tubular framing may be secured to the center channel bars 24 in any suitable manner, the preferred connection, as will be apparent from Figures 1 and 3, contemplates that these laterally extending tubular framing elements be disposed in the same horizontal plane as the channel bars 24 and extend through suitable aligned openings (not shown) provided in the base wall of the channel bars. In order to fixedly relate the laterally extending frame elements 36, 37, 38 and 39 to the channel bars 24 and to positively connect these channel bars in the desired relative laterally spaced position at the center of the trailer, it is preferred that the peripheries of the tubular frame elements, where they pass through the channel bar openings, be welded to the channel bars 24. If this is done, an extremely rigid framing structure will result with the channel bars 24 forming a main centrally located girder structure of extreme rigidity and structural strength.

While any suitable order of securing the framing elements to one another and to channel bars 24 may be resorted to, it will be appreciated that channel bars 24 are intended, in addition to serving as a main central girder for the trailer structure, to provide respective inwardly facing track ways adapted to receive and rollingly support rollers 43 and 44 (Figure 3) of a forwardly and rearwardly movable carriage 45 the purpose of which will be presently pointed out. For this reason, it is preferred that the lateral element 36 be first secured to the channel bars 24 to establish the lateral spacing of the channel bars in this initial operation. Framing elements 39 angling forwardly and inwardly are then preferably inserted through the forwardly disposed openings in channel bars 24 and welded in place at the points where they pass through channel bars 24, at their points of contact centrally of the spaced channel bars and to the opposite ends of the element 36. When these steps are completed, the main girder structure will be firmly joined for ready handling and rapid completion of the skeleton frame trailer.

At this stage in the assembly, the roller carriage 45 is preferably entered into the track ways provided by channel bars 24 from the rear end and pushed forwardly sufficiently to at least clear the channel bar openings provided for element 38. Frame elements 37 and 38 are then preferably inserted through their respective channel bar openings and welded to the channel bars to complete the central girder structure. Side frame members 34 and 35 with wheel support brackets 46, to be hereinafter described in detail, telescoped on their forward ends are then preferably placed in position and respectively welded first to the opposite ends of framing element 36, then to the opposite ends of reinforcing framing element 38 and are finally welded to the opposite ends of the rear end framing element 37. While it is preferred in making this last connection to cut the tubular framing elements 35 and 37 at a 45° angle to make a square rear end joint, it will be appreciated that this is not essential. Framing elements 40 angling inwardly and upwardly from the rear corners to a cross bar 40a are then welded in place to provide further reinforcement of the rear end.

The skeleton frame at this stage is then preferably provided with upstanding L-shaped floor support brackets 47 preferably set slightly inwardly from the side frame elements 34 and 35 and to the inner faces of lateral frame elements 36, 37 and 38 where they will be out of the way of carriage 45 and wheel support brackets 46. To this end long leg 48 of brackets 37 is suitably secured to the respective framing elements 36, 37 and 38, either by riveting or welding, so that the faces of the short legs 49 will lie in a common plane parallel to and spaced a sufficient distance above the plane of the top surfaces of channel bars 24 and side frame elements 34 and 35 to clear the base structure of carriage 45 and the wheel support brackets 46 and appertinent structure to be hereinafter described. While any suitable means of attachment may be employed, the present invention contemplates as a preferred means welding of the floor brackets to the framing elements. As will be clear from an inspection of Figures 1 and 3, these floor brackets 47 are disposed in areas adjacent the inside of framing elements 34 and 35 well away from channel bars 24 so that no interference will be offered to free longitudinal movement of carriage 45 along the trackways provided by channel bars 24.

One of the important features of novelty of the present invention resides in the simple, inexpensive means for securing relative bodily movement of the skeleton framing and channel bars 24 with respect to the wheel and axle assembly indicated generally by the numeral 51. In the form of invention disclosed in Figures 1 to 5, this is accomplished by use of support brackets 46 the details of which are best illustrated in Figure 5. As there shown, each support bracket 46 comprises a base block 53 of substantial thickness having longitudinally extending notches 54 along its opposite upper edges to receive the lower ends of a substantially inverted U-shaped cap element 55. The depending legs 56 of cap 55 are securely fixed in notches 54, preferably by welding or by bolts if easy removability of the caps is desired, and are apertured inwardly of their lower ends to receive the opposite ends of a roller shaft 57 preferably in press-fitted relation. The portion of shaft 57 lying between depending legs 56 mounts a roller 58 having a self lubricating bearing sleeve fitted therein to assure free relative rotation of roller 58 on shaft 57. Roller 58 as clearly seen in Figure 5, is preferably of concave configuration from end to end to effectively assure centering of the respective side framing elements 34 and 35 between depending legs 56 under the weight of the skeleton frame and its load disposed between roller 58 and the curved upper portion of bracket 46. As more clearly seen in Figure 4, each bracket 46 is elongated in the direction of extension of the side framing elements and the depending legs 56 of each bracket 46 support spaced pairs of shafts 57 and rollers 58. Since the weight of the trailer and its load act downwardly upon these rollers and as axle assembly 51 has an axle journal and mounting bracket 61 bolted to the base blocks 53 of brackets 46 with the axle portion 62 centered with respect to the rollers, it will be appreciated that the normal downwardly acting weight of the skeleton frame and its load will automatically assure full contact between the pair of rollers of each bracket and the respective side frame elements 34 and 35.

While any suitable form of wheel and axle assembly 51 may be employed without departing from the spirit of this invention, a preferred wheel and axle assembly is that sold on the market under the trade name "Prior." Such wheel and axle assemblies embody a main axle portion 62 having the opposite ends offset from one side of the portion 62 to provide wheel and brake flange support spindles 63 and frame mounting brackets 61 located at the ends of portion 62. In addition to the frame mounting brackets 61 axle portion 62 adjacent each support bracket 61 is surrounded by a coil spring 64 the opposite ends of which are fixed respectively to bracket 61 and axle portion 62. The brake flanges journalled on forwardly offset wheel spindles 63 are in turn connected to the bracket 61 by linkage thereby transferring the brake torque to the skeleton frame through the wheel support brackets 46. As a result of this structure, the frame and its load are sprung with respect to the axle assembly and braking torque bypasses the springs and the spring load remains unchanged no matter how hard the brakes are applied. It follows, therefore, that such a wheel and axle assembly, when bolted to the sliding wheel and axle support bracket 46 of this invention, will assure that the skeleton frame and its load will be a sprung load.

While brackets 46 are preferably assembled with respect to the side framing elements 34 and 35 before the side framing members are welded to the cross framing elements so that the bracket assemblies 46 may be preformed welded units of maximum strength, it will be appreciated that bolting of legs 56 of element 55 to block 53 would provide an assembly attachably and detachably related to frame elements 34 and 35 at any time after they are welded to the cross frame elements.

Since wheel brackets 46 and their attached wheel and axle assemblies 51 are freely movably along side framing elements 34 and 35, the present invention contemplates a latching means for retaining the brackets 46 and the attached wheel and axle assembly 51 in running position. As here illustrated, the latching assembly comprises a sleeve element 67 fixedly mounted on each of the side framing elements 34 and 35 at the rear of the normal running position of the wheel and axle assembly and providing an upstanding rearwardly sloping latching face 68 (Figure 4) and a cooperating movable latch element 71 pivoted to a bracket 72 welded on the top of bracket member 46. As will more clearly appear from Figure 4, the latching element 71 has a matingly sloped abutment hook 73 at its free end and is biased toward latched position by a coil spring 75 encircling the latch pivot 76 in conventional manner. Once engaged, the separating forces acting forwardly on latch element 71 due to braking torque will tend to augment the force of spring 75 holding the latch assembly engaged more forcefully as the torque increases. It will be appreciated that this latching mechanism is, therefore, entirely satisfactory and due to the slope of the rearmost face of hook 73 is self coupling as the frame moves forward under power of the tractor vehicle. It, furthermore, will be understood that the latch assembly is required only to overcome braking torque and when it is necessary to back up the trailer since the tractor pull is applied normally to the sliding frame rather than the wheel and axle assembly and forward movement tends to slide the frame forwardly with respect to the wheel support brackets 46 causing the opposed end faces 77 and 78 respectively of the bracket 46 and sleeve 68 to abut. So long as sufficient play exists to back the sloping faces of catch 68 and hook 73 apart, the latch assemblies may be readily uncoupled to permit unloading rearward movement of the skeleton frame. A similar latching arrangement 81 mounted in straddling relation to channel bars 24 is provided to lock carriage 45 in its normal forward, load supporting, operating position.

It will, furthermore, be appreciated from Figures 1 and 2 and 3 that carriage 45 is adapted to receive a substantially V-shaped boat hull engaging element 82 the opposite arms of which are preferably disposed at a wide angle to suitably cooperate with the hull structures of various size boats. This V-shaped support member is preferably provided with a pair of dependent locating pins 83 (Figures 1 and 2) which pass downwardly into suitable openings (not shown) provided in the center web of carriage member 45 at points spaced inwardly of the roller elements, preferably mounted adjacent each end of the carriage. Such locating pins 83 are completely adequate for this purpose since the weight of the boat itself will tend to hold the support member 82 firmly down against the carriage and a rope or the like tied to the skeleton framing and looped over the upper part of the bow and drawn tight will give adequate assurance against disassociation of the locating pins if this should prove to be necessary. It follows, therefore, that the bow support element 82 is provided primarily to guard against lateral shifting of the bow of a transported boat during travel along the road only.

In order to prevent tipping of the boat in transit, the present invention contemplates a rear end mounted cradle structure composed of a pair of longitudinally extending support members 86 laterally spaced to opposite sides of channel bars 24 and respectively pivotally attached between the upstanding ears 87 of support brackets 88 on pivot pins 89. Support brackets 88 preferably include a depending mounting stem 91 removably associated with a selected one of a series of apertures 92 provided in the rear framing element 37. Due to the pivotal mounting of the arms 86 and the pin mounting of the brackets 88 in framing element 37, it will be appreciated that this cradle is capable of automatically adjusting itself to the particular shape of the stern of the boat to be transported and assures an adequate support in conjunction with suitable tie-down means at the rear end for securely fastening a boat to the skeleton trailer frame.

Since a boat of any size presents a loading and unloading problem, the present invention further proposes loading and unloading means to enable a boat owner to load and unload the trailer himself. This means comprises a hand or power driven cable winch 95 riveted to the top flanges of channel bars 24 forwardly of cross frame element 36, keel engaging roller 96 mounted on a generally U-shaped bracket 97 pivoted at one end to frame element 37 between channel bars 24 and rear end corner rollers 99 to be further described. Assuming a boat is to be loaded, the trailer would be backed partially into shallow water and its wheels would then be chocked as indicated at 98 (Figure 2) and coupling pin 25 would be removed and latches uncoupled. The automobile, presumably having been driven onto sound beach ground adjacent the water's edge, would then be backed as close as possible to the water's edge to lower the back end of the trailer into the shallow water and dispose the skeleton frame at an angle such as indicated in dot-dash lines in Figure 2 with roller bracket 97 being pressed upwardly, due to ground contact, in position to engage roller 96 with the keel and rear end corner rollers 99 with the ground.

The boat owner then moves carriage 45 with its hull engaging element 82 in place backwardly along the channel bar trackway to the frame element 38 where it will be in position to receive the bow of the boat floated toward it in the water and connects the free end of the cable of cable winch 95 to the boat anchor cleats at each side of the bow deck. He then operates the winch to draw the boat with its bow supported by carriage 45 forwardly with respect to the skeleton trailer frame, the translating movement of carriage 45 and the floating of the boat stern in the water making this a reasonably easy task. As the boat is drawn forward and tilted with respect to the surface of the water, its keel will rollingly engage the roller 96, this assuring easy forward relative movement of the boat relative to the skeleton frame trailer until it reaches a desired relative position to be supported by cradle arms 86.

At this stage the bow of the boat is preferably securely lashed to the frame and the automobile is driven slowly forward to slide the skeleton frame and its supported boat forwardly relatively to the chocked wheel assembly 61, the skeleton frame and its load being simultaneously pivotally moved with respect to the stationary wheels due to the bearing connection between the wheels and axle spindle until it assumes its horizontal road travel position with brackets 46 automatically latched. During this operation, the roller bracket 97 will have been raised from the ground thus permitting the boat stern to settle onto cradle bars 86 and draw bar 17 will have been rotated around its hinge pin 23 to its normal road travel position so that lock pin 25 can be inserted. The loaded trailer is then ready to go as soon as the wheel chocks are removed and the stern is lashed down. Unloading is accomplished by a mere reversal of the loading steps.

If flooring is to be used in place of boat hull support 82 and cradle arms 86, these structures are removed and flooring 101 is attached to brackets 47 by bolt and nut assemblies 102 as shown in Figures 7 and 8. Upstanding sides 103 and end boards 104 (the rear only being illustrated, see Figure 8) may be associated with flooring 101 by means of conventional well known support stakes 105 associated with side and end board loops 106 and suitably aligned apertures in the flooring (not shown) and shown at 107 in Figure 1.

In event a wheel assembly 61 having a straight axle 111 (Figure 6) and conventional leaf spring and shackle assemblies 112 is to be employed in lieu of the special wheel and axle assembly previously described, two brackets 46 at each side adapted for conventional connection to the ends of leaf spring 112 could be used. In the alternative, simple cylindrical brackets 113 (Figure 6), the rearmost one of each pair mounting latch bracket 72 and latch element 71 could be used with such a leaf spring wheel and axle assembly as illustrated in Figure 6. If desired each of these brackets could be provided with self lubricating sleeve bearings (not shown) to assure free relative sliding movement along side frame elements 34 and 35.

Referring to Figures 7 and 8, the only difference in this form of the invention is that the framing elements 34, 35, 36, 37 and 38 are replaced by I-beam cross section framing elements 34a, 35a, 36a, 37a and 38a and wheel support brackets 46 are replaced by underslung wheel support brackets 46a. The brackets 46a instead of utilizing rollers 58 like that of the previous embodiment employs rollers 116 that are cylindrical from end to end to engage the face of lower I-beam flanges 117 journalled on shaft 118 press fitted in upstanding guide arms 119 the upper ends of which are respectively inturned as at 121 to overlie, in slightly spaced relation, the inner faces of I-beam flange 117.

The operation of this form of the invention is identical to that of the first embodiment. However, the dot-dash line showing in Figure 7 depicts an intermediate tilted position between the two positions of Figure 1 obtained by moving the skeleton frame backward a desired increment only of that in Figure 1. This intermediate position is desirable to secure a steeper inclination of the frame and floor desirable in discharging bulk loads or the loading of power lawn mowers or light farm equipment that it may be desired to transport from place to place.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A utility trailer adapted for attachment to a conventional passenger automobile comprising an elongated skeleton frame having a pair of longitudinally extending side framing elements of cylindrical tubular cross section, cross members connecting said side framing elements at the front and rear ends thereof, a wheel and axle assembly extending beneath said skeleton frame adapted to support said skeleton frame, a support bracket secured to each end of said assembly and having supporting rollers adapted to engage said side framing elements in supporting relation, each of said support brackets comprising an inverted U-shaped element receiving a side framing element and supporting said skeleton frame for longitudinal sliding movement relative to said wheel and axle assembly, said supporting rollers comprising a pair of horizontally spaced rollers for each support bracket and mounted on axles extending between the sides of said U-shaped element whereby said side framing elements rest in supporting sliding relation on said rollers, means mounted on each of said side framing elements rearwardly of said support brackets for engaging said support brackets in abutting relation in the normal running position of said wheel and axle assembly, a releasable latch element connecting said means to said support brackets to restrain relative movement between the skeleton frame and the support brackets in the reverse movement of said trailer, and hitch means on the front end of said skeleton frame adapted to connect said skeleton frame to said passenger automobile whereby upon chocking of the wheels of said wheel and axle assembly and releasing of the latch elements, the skeleton frame may be slid rearwardly relative to the wheel and axle assembly.

2. A utility trailer adapted for attachment to a conventional passenger automobile comprising an elongated skeleton frame having a pair of longitudinally extending side framing elements of tubular cross section, cross members connecting said side framing elements at the front and rear ends thereof, a wheel and axle assembly extending beneath said skeleton frame adapted to support said skeleton frame, a support bracket secured to each end of said assembly and having supporting rollers adapted to engage said side framing elements in supporting relation, each of said support brackets comprising an inverted U-shaped element receiving a side framing element and supporting said skeleton frame for longitudinal sliding movement relative to said wheel and axle assembly, said supporting rollers comprising a pair of horizontally spaced rollers for each support bracket and mounted on axles extending between the sides of said U-shaped element whereby said side framing elements rest in supporting sliding relation on said rollers, means mounted on each of said side framing elements rearwardly of said support brackets for engaging said support brackets in abutting relation in the normal running position of said wheel and axle assembly, a releasable latch element connecting said means to said support brackets to restrain relative movement between the skeleton frame and the support brackets in the reverse movement of said trailer, and hitch means on the front end of said skeleton frame adapted to connect said skeleton frame to said passenger automobile.

References Cited in the file of this patent

UNITED STATES PATENTS

| Number | Name | Date |
| --- | --- | --- |
| 2,332,326 | Lex | Oct. 19, 1943 |
| 2,374,383 | Sampsell | Apr. 24, 1945 |
| 2,558,418 | Brueckman | June 26, 1951 |
| 2,700,480 | Triplett | Jan. 25, 1955 |
| 2,744,643 | Hipp | May 8, 1956 |
| 2,745,661 | Van Raden | May 15, 1956 |
| 2,793,774 | Lovegreen | May 28, 1957 |
| 2,799,416 | Balko et al. | July 16, 1957 |

FOREIGN PATENTS

| Number | Country | Date |
| --- | --- | --- |
| 224,638 | Great Britain | Nov. 20, 1924 |